Patented July 20, 1926.

1,593,544

UNITED STATES PATENT OFFICE.

JEAN FRANÇOIS ALFRED AUDIBERT, OF MARSEILLE, FRANCE.

PROCESS FOR THE TREATMENT OF THE SEED OF THE CAROB TREE.

No Drawing. Application filed October 12, 1925, Serial No. 62,207, and in France October 10, 1924.

This invention relates to a process for the treatment of the seed of the carob-tree or any other appropriate plant to extract the gum in its liquid or viscous state for subsequent transformation into a dry product capable of being pulverized.

Gums used in commerce for industrial, comestible or pharmaceutical purposes, are generally obtained from the seed of the locus bean or the carob-tree (acacia type) (*Ceratonia siliqua*).

Known processes give a mixture in which the cellulose and amyl-acetate products contained in the endosperms of the seed are in suspension in proportions which vary according to where they are grown and the maturity of the seed being treated.

The proportion of amyl-acetate product which alone provides a viscous matter generally varies between 25% and 50% of the total quantity of the mixture. Further this mixture is only obtained at the liquid or viscous state and the period during which it remains in good condition is very limited.

Finally, the various phases of the treatment necessitate considerable labour which increases the cost of production.

The invention relates particularly to a process for treating in dry condition, seed of the carob-tree or any other appropriate plants, which permits of increasing in large proportion the quantity of amyl-acetate product contained in the mixture furnished by the endosperms of said seed and to cause the celluloid material to be more resistant in water. The process also permits of extracting the product thus transformed, in the liquid or viscous state and then to transform it into a dry product which can then be pulverized.

The process of treatment according to the invention comprises the following characteristics:—

Whole seed of the carob-tree are taken and freed of their outside skin as well as the ovarium. This operation is effected in dry state by passing said seed through rollers provided for the purpose and through crushers.

The endosperms thus prepared are then introduced into a thermic transforming apparatus, preferably a rotary oven type which can be heated to 150° C., which maximum should not be exceeded, by any suitable heating means.

The period of heating varies according to the nature of the apparatus and the method employed for heating; it must cease when the transformed endosperms have a golden brown colour which is an essential condition for ensuring the integral recuperation of the gum which they contain.

The endosperms thus transformed are projected into a bowl containing roughly twenty times their weight, of boiling water. They are kept at that temperature for two hours while stirring slowly in such a manner as not to crush said endosperms which should only be kept in suspension in the bath for six hours.

The viscous product obtained in this manner is drawn in by a pump which forces it through a bronze sieve filter in order to pass it on to filters of tissue called "sack filter machines" or in sieve machines, whose sieve consists of a trellis of bronze wires.

The gum, on leaving the apparatus, is transparent and of a sufficiently resisting viscosity.

It is then introduced in a suitable hot-air drier, and on leaving same it is collected in dry state which permits of finally pulverizing the material to a degree of fineness by means of stone grinders.

It will be understood from what has been written, what great advantage this treatment of carob-tree seeds provides, such seeds being previously separated, in dry state, of their outer skin and their ovarium.

The time during which the endosperms are in the thermic transforming apparatus till they reach a golden brown colour, then their malaxing in boiling water, permits of obtaining after filtration, a transparent and viscous mixture almost exclusively consisting of the gum.

Finally, this product having been brought to a dry and pulverized condition, can, in this manner, be very readily handled, stored, transported and its duration of conservation is unlimited.

It is to be well understood that the process of treatment can be applied to all seed or fruits capable of furnishing the material essentially sought and that the gums thus obtained can be combined with other materials according to the industrial, comestible or pharmaceutical purposes to which they may be intended for use.

I claim:

Process for the treatment in dry condition of carob-tree seed (acacia kind) (*Ceratonia siliqua*) or other appropriate seed to extract therefrom the whole of the gum in liquid or viscous state, then to transform said gum into a dry product which can be pulverized in order to facilitate the handling, the packing, and the transport and to increase the duration of conservation, this process of treatment being particularly characterized in that the seeds are first separated from their skin or shell by submitting them, in dry condition, to the action of rollers and crushers, that the endosperms are placed in a thermic transforming apparatus until they take a golden brown colour and when thus transformed are thrown into a bowl containing about twenty times their weight of boiling water and in which they are malaxed and kept in suspension for a determined period, the viscous product obtained from the previous operation being drawn in by means of a pump and distributed to filter or sieve machines which change it into clear gum, which is introduced into a hot-air drying apparatus whence it is collected in a dry state, then ground and pulverized by stone grinders.

JEAN FRANÇOIS ALFRED AUDIBERT.